H. E. HAYWARD.
CHAIN LINK.
APPLICATION FILED MAY 27, 1908.
1,011,781.
Patented Dec. 12, 1911.
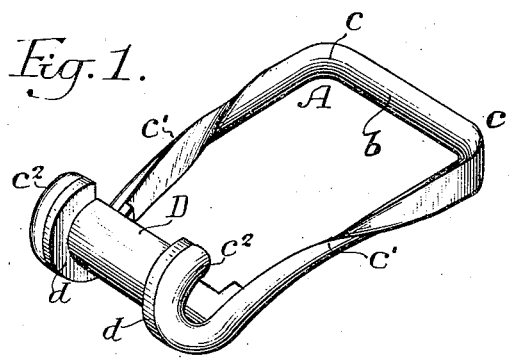
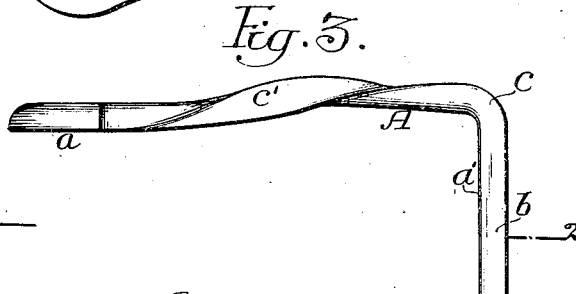
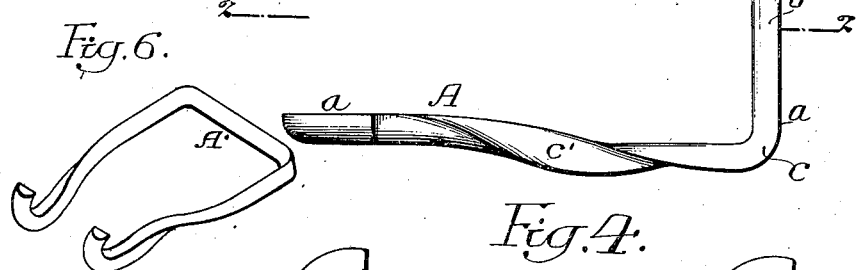
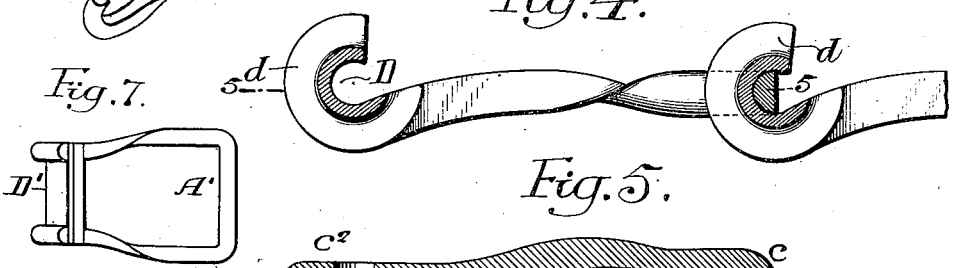
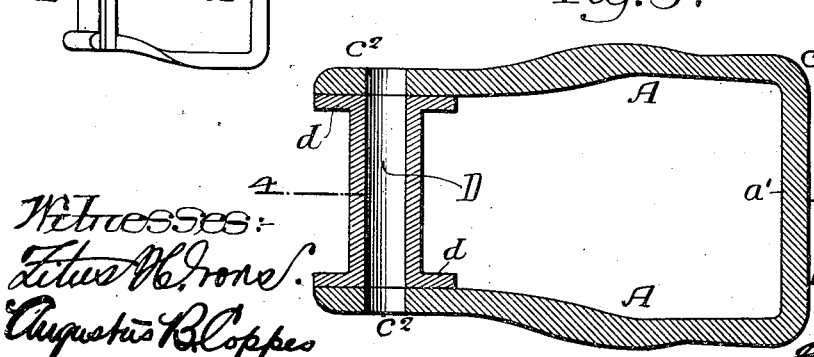

UNITED STATES PATENT OFFICE.

HENRY E. HAYWARD, OF PHILADELPHIA, PENNSYLVANIA, ASSIGNOR TO LINK-BELT COMPANY, OF CHICAGO, ILLINOIS, A CORPORATION OF ILLINOIS.

CHAIN-LINK.

1,011,781.  Specification of Letters Patent.  Patented Dec. 12, 1911.

Application filed May 27, 1908. Serial No. 435,327.

*To all whom it may concern:*

Be it known that I, HENRY E. HAYWARD, a citizen of the United States, residing in Philadelphia, Pennsylvania, have invented certain Improvements in Chain-Links, of which the following is a specification.

One object of my invention is to make a link of bent wrought metal, the parts being welded together in such a manner that one link can be readily coupled to another.

A further object of the invention is to manufacture the link from half-round wire so that the pin member will have a round bearing surface and there will be a flat surface at the socket end so that an intervening section can be properly welded to the wire section.

In the accompanying drawings:—Figure 1, is a perspective view of my improved chain link; Fig. 2, is a sectional view on the line 2—2, Fig. 3, showing the wire bent into form; Fig. 3, is a plan view of Fig. 2; Fig. 4, is a sectional view on the line 4—4, Fig. 5; Fig. 5, is a sectional view on the line 5—5, Fig. 4, of the completed link; and Figs. 6 and 7, are views of modifications of my invention.

A is a piece of half-round wire, as shown clearly in Fig. 2, this half-round wire is bent at $c, c$ to form a pin member $b$ with a bearing face $a'$ and twisted at $c', c'$ a half turn so as to throw the flat surfaces $a$ of the half-round wire on the inside instead of on the outside, as at the pin section of the link. This will give a flat surface to which the connecting hooked member or spool D can be readily welded. The spool in this instance is flanged at $d$ so as to increase the surface of contact with the hooked portion $c^2$ of the wire, and the welding can be done by any suitable welding process. The link is preferably made so that the outside width of the link at one end will be equal to the inside width of the link at the opposite end, in order that the bent section of one link will fit in the socket section of an adjoining link. Thus it will be seen that I can make a very substantial link, which is cheap in construction and can be readily welded by any of the well known electric or other methods, and the strength of the link will be equal to the ordinary malleable iron or pressed steel links.

It will be noticed that the round portion $a'$ of the wire forms a bearing as shown in Fig. 4, which rests in the socket of an adjoining link, so that there is practically no finishing necessary after the parts of the link have been assembled. In some instances I may bend the wire $A'$ a quarter turn instead of a full half turn, so as to bring the flat surface on the inner surface of the hook, as shown in Fig. 6, and then I weld this flat surface to the surface of the socket D′, forming a strengthening rib on each side of the socket, at the same time uniting the wire sections to the socket, as shown in Fig. 7.

I claim:—

1. A chain link having side members half round in cross section, and a cross bar at one end half round in cross section, the side members being twisted so that at the cross bar end of the link the flat surface of the bar will be on the outside of the link and at the socket end of the link the flat surface of the bar will be on the inside, and a socket member located between the side members of the link and secured to the flat surfaces of said side members.

2. A link having side members and a cross bar half round in cross section, said side members being twisted and bent to form hooks at one end of the link; the curved surface of the cross bar being on the inside of the link, and a flanged socket member extending from one hooked side member to the other and alining with the hooks.

In testimony whereof, I have signed my name to this specification, in the presence of two subscribing witnesses.

HENRY E. HAYWARD.

Witnesses:
  WALTER CHISM,
  WM. A. BARR.